Nov. 18, 1930.  D. R. MEANS  1,781,987
PROCESS OF TREATING AMMONIACAL LIQUORS
Filed Sept. 20, 1926
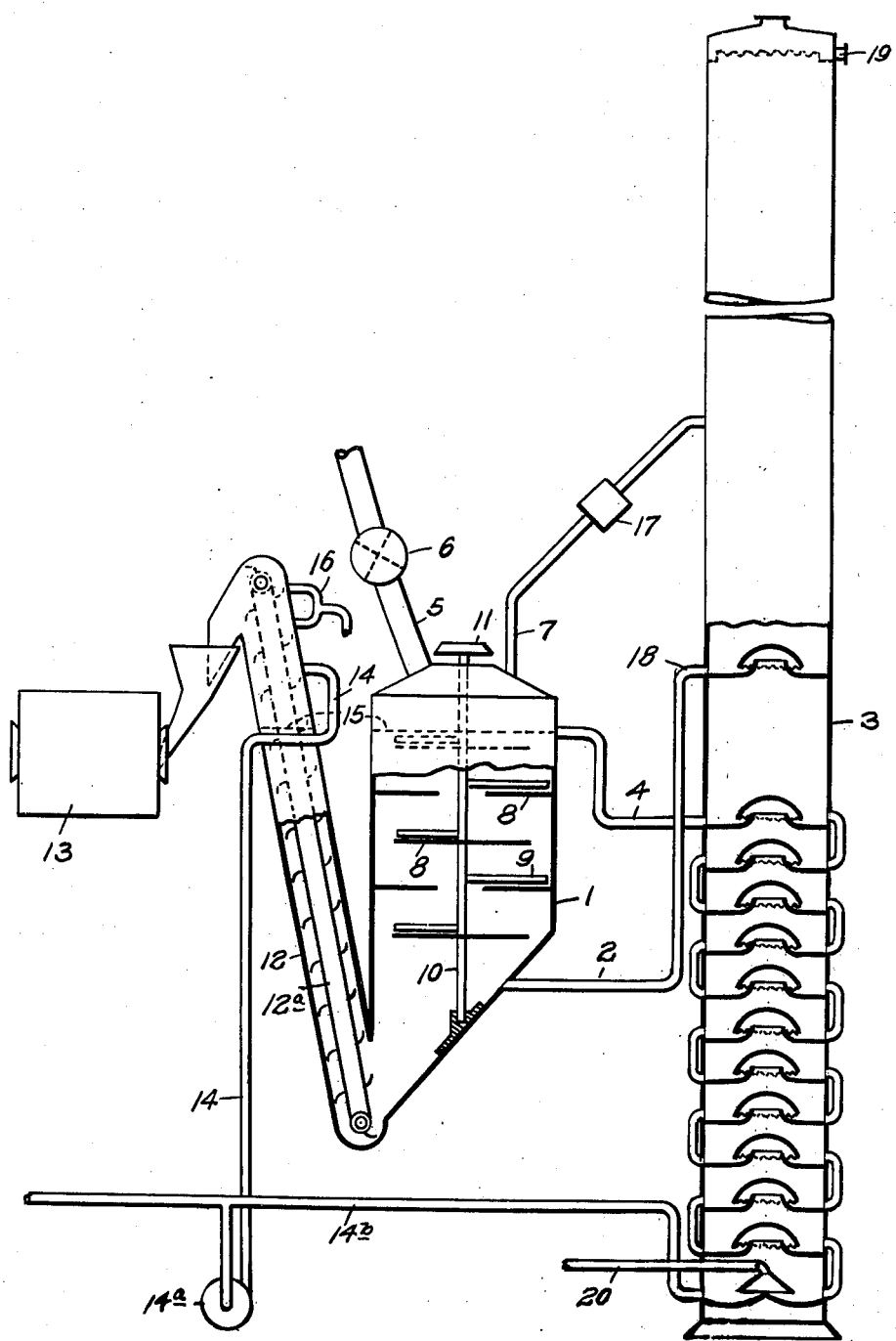

Patented Nov. 18, 1930

1,781,987

UNITED STATES PATENT OFFICE

DWIGHT R. MEANS, OF MADENA COUNTY, OHIO, ASSIGNOR TO PITTSBURGH PLATE GLASS COMPANY, A CORPORATION OF PENNSYLVANIA

PROCESS OF TREATING AMMONIACAL LIQUORS

Application filed September 20, 1926. Serial No. 136,542.

The invention relates to a process of distilling ammonia from solutions where lime is necessary to free the ammonia, an example being the distillation of ammonia in the ammonia soda process. Here, the liquor contains large amounts of ammonium carbonate and ammonium chloride. The carbonate is broken up by the application of heat and the $CO_2$ driven off, after which milk of lime is added to decompose the ammonium chloride, and the ammonia is distilled off with steam. The milk of lime carries a large amount of water, usually 70 to 80 per cent, which must be heated either before or after entering the distilling apparatus. One object of the present invention is the saving of the heat required for heating the water in the milk of lime. Another object is to still further economize in the heat required in the distiller by utilizing the heat liberated in the slacking of the quick lime which is used in the improved process in place of the milk of lime; the process in this respect also involving a saving over that of my copending application, Serial No. 136,540, filed on even date herewith in which dry hydrated lime is employed. The present process also involves an improvement over that of my copending application, Serial No. 136,541 filed on even date herewith which discloses the use of pulverized quick lime, in that the present process avoids the grinding or pulverizing of the quick lime, thus reducing the cost and leaving the unburned stone unground, so that it is possible to recover this stone and return it to the kiln for burning. This is important in the ammonia process, where in order to get a high per cent of $CO_2$ in the gas from the lime kilns, such kilns are usually operated to give a high per cent, 5 to 12 per cent, of unburned stone in the lime. The loss of this much stone would be a serious one. One form of apparatus for treating the ammoniacal liquor preliminary to distillation is shown in the accompanying drawing, wheren:

The figure is a diagrammatic side elevation partly in section.

In carrying out the process, an ammoniacal liquid, such as that from the ammonia soda process containing ammonium chloride (the ammonium carbonate having been driven off by heat through the application of steam) is conducted into the tank 1 through the pipe 2 and then carried to the distilling apparatus or still 3 through the pipe 4. Quick lime is introduced into the tank from the conduit 5 provided with the rotary feeder 6. This feeder is divided into four or more sections and revolves in a close fitting housing. This type of feeder reduces the leakage of gas through the conduit to a minimum. The effect of any leakage is also minimized by providing the suction line 7 to which an automatic vacuum regulator 17 is applied, and which maintains a slight vacuum so that any leakage at the feeder is inward.

The tank is provided with a series of trays 8, over which the agitator arms 9 move. These arms are carried by the shaft 10 suitably driven from the gear 11 at its upper end. The lime supplied through the conduit 5 is caught by the upper tray, and is then raked therefrom by an agitator and falls by gravity to the next tray. The lime in this way gradually works downward and is slacked and goes into solution or is suspended in the liquor. Any of the material which reaches the bottom of the tank is largely unburned stone and impurities which are picked up by a suitable elevator in the casing 12, such elevator, as shown, consisting of a driven endless belt $12^a$ provided with suitable scoops or cups. At the upper end of the casing the material is discharged to a washer 13 from which the unburned stone may be recovered and transferred to the kiln for burning.

Means of various kinds are provided for reducing the loss of any ammonia passing into the casing 12. One of these is a blow off pipe 14 leading from the pump $14^a$, supplied with waste liquor from the blow off pipe $14^b$ of the still. This washes the ammonia out to a large extent. Since the liquor is hot, direct from the still, practically no heat will be used in running a considerable volume through the still a second time. The liquor can be sprayed into the casing 12 if desired. Another means for reducing the loss of ammonia escaping through the casing 12 consists of the small cold water sprays 16 leading into the top of the casing. These sprays serve to wash the ammonia out of the vapor rising in the casing and return it to the liquor.

The washer 13, spray 16 and circulation of distilled liquor through pipe 14 are all intended to prevent the loss of ammonia either as a vapor or as an absorbed liquor with the material being conveyed out. Under some conditions it will not be necessary, from an economical view point, to use all of them. For example, in most cases, the washer may be dispensed with.

If the pressure in the still at the point 18 is materially above or below atmospheric pressure, it might be necessary to install pumps in lines 2 and 4 to insure a good flow and still maintain only a slight vacuum in the vessel 1. Under some operating conditions it is desirable that the vessel 1 be maintained at only slightly below atmospheric pressure in order to prevent an excessive volume of air from being drawn in through the line feeder. However, often it is an economic advantage to operate the still 3 with a vacuum of two to ten inches of mercury. In the latter case, liquor under some circumstances may not flow down through the pipe 2 to the tank 1 because of the difference in pressure. When this occurs, it is necessary that the transfer be made with a pump.

In operation, liquor containing various ammonium compounds, but largely as ammonium carbonate, and ammonium chloride enters the top of the distiller through the pipe 19 and flows down through a suitable packing in the casing, such as coke, where it is acted upon by steam supplied through the pipe 20, and flowing upward through the casing. The packing coke referred to is the usual packing in distillation columns. Coke varying from about two to ten inches in size is introduced into the upper part of the still 3 so as to fill substantially the entire space extending from the pipe 18 to within two or three feet of the liquor inlet 19. The heat breaks down the ammonium carbonate and the steam carries off the carbon dioxide and ammonia resulting from the decomposition of the carbonate. It is essential that this reaction be completed before lime is added, otherwise, there would be a reaction between the carbon dioxide and lime, neutralizing the effect of the lime. The liquor introduced into the still 3 may vary considerably in its composition. As an example, it may be stated that the liquor contains usually from 45 to 55 grams per liter of $NH_3$ in the form of ammonium chloride, about 1 gram per liter of ammonium sulphate, 65 to 90 grams per liter of sodium chloride, 10 to 20 grams per liter of $NH_3$ in solution as ammonium hydroxide and less than 1 gram per liter of $CO_2$. The ammonia present as the hydroxide probably is carried up into this liquor from the lower part of the still 3 during the process of fractional distillation. Ammonium carbamate may be formed. If it is, it is broken up by the steam and heat treatment and the result, $CO_2$, is carried off with the ammonia and steam at the top of the apparatus. A small proportion of sodium chloride may be present but it is of relatively minor importance and, as stated, it is only present in a small quantity and represents that portion of the salt which has not been converted into sodium bicarbonate in the ammonia soda process. Liquor of the above character, which has been subjected to a steam treatment in the upper part of the still 3, is drawn from the still at 18 through the pipe 2, and passes into the mixing tank 1 where the lime is added to secure the decomposition of the ammonium chloride, forming calcium chloride and free ammonia. The liquid passes through the outlet pipe 4 to the still, or distiller, in the lower portion of which the ammonia distills off, the calcium chloride remaining in solution and passing out at the bottom through the pipe 14$^b$ with other waste materials, such as, finely divided impurities from the lime.

The gases coming off the top of the still 3 will vary somewhat in temperature but usually they are held between 75 and 85° C. This is usually regulated by the quantity of steam entering the bottom of the still 3. The pressure at the top of the still 3 usually varies from 0 to 10 inches of mercury vacuum but, obviously, this range of pressure is merely illustrative as the still 3 can be operated at pressures outside of the range given. The temperature of the liquid at the bottom of the still 3 usually varies between 100 and 115° C., depending on the vacuum carried at the top of the still. The pressure at the bottom of the still is usually from 0 to 8 pounds gage, due to the resistance through the still. The temperature in the mixing tank 1 may vary. Satisfactory results have been obtained by using a temperature varying between 90 and 105° C.

What I claim is:

1. The process of recovering ammonia from liquor containing fixed ammonium compounds including ammonium chloride comprising supplying at one end of a mixer a quantity of unpulverized quick lime containing unburned lime stone in an amount necessary to decompose the fixed ammonium compounds, supplying countercurrently at a remote portion of the mixer ammoniacal liquor, allowing the unpulverized quick lime containing the unburned lime stone to gradually work downwardly and be suspended in the ammoniacal liquor and the unburned lime stone to settle and segregate in the lower portion of the liquor, removing the unburned lime stone from the liquor, and subjecting the liquor containing the lime suspension to distillation to recover ammonia therefrom.

2. The continuous process of recovering ammonia from liquor containing fixed ammonium compounds including ammonium chloride and from which the free ammonia has been removed comprising supplying at one end of a mixer containing a series of trays a quantity of unpulverized quick lime containing unburned lime stone in a quantity sufficient to decompose the fixed ammonium compounds, supplying countercurrently at the lower portion of the mixer ammoniacal liquor, feeding the unpulverized quick lime containing unburned lime stone to the first of the series of trays, positively feeding said material to others of said series of trays, whereby the quick lime gradually works downwardly in the mixer and enters into suspension in the ammoniacal liquor and the unburned lime stone segregates in the lower portion of the liquor, removing the unburned lime stone from the liquor, and subjecting the liquor containing the lime suspension to distillation to recover the ammonia therefrom.

3. The continuous process of recovering ammonia from liquor containing fixed ammonium compounds including ammonium chloride and from which the free ammonia has been substantially removed comprising supplying at one end of a mixer a quantity of unpulverized quick lime containing unburned lime stone in an amount necessary to decompose the fixed ammonium compounds, supplying countercurrently at the lower portion of the mixer ammoniacal liquor, positively feeding downwardly through the ammoniacal liquor the unpulverized quick lime containing the unburned lime stone, settling and segregating the unburned lime stone in the lower portion of the liquor, removing the unburned lime stone from the liquor, removing ammonia from the unburned lime stone by washing with waste liquor from the process, passing the partially purified lime stone to a washer for washing prior to reburning, and subjecting the liquor containing the lime suspension to distillation to recover the ammonia therefrom.

4. The continuous process of recovering ammonia from liquor containing fixed ammonium compounds including ammonium chloride from which the free ammonia compounds have been substantially removed comprising supplying at one end of a mixer containing a series of trays a quantity of unpulverized quick lime containing unburned lime stone in a quantity sufficient to decompose the fixed ammonium compounds, supplying countercurrently at the lower portion of the mixer ammoniacal liquor, feeding the unpulverized quick lime containing unburned lime stone to the first of the series of trays, positively feeding said material to others of said series of trays whereby the quick lime gradually works downwardly in the mixer and enters into suspension in the ammoniacal liquor and the unburned lime stone segregates in the lower portion of the liquor, removing the unburned lime stone from the liquor, removing ammonia from the unburned lime stone by washing with waste liquor from the process, passing the partially purified lime stone to a washer for washing prior to reburning, and subjecting the liquor containing the lime suspension to distillation to recover the ammonia therefrom.

5. The continuous process of recovering ammonia from liquor containing fixed ammonium compounds including ammonium chloride from which the free ammonia compounds have been substantially removed comprising supplying at one end of a mixer a quantity of unpulverized quick lime containing unburned lime stone in an amount necessary to decompose the fixed ammonium compounds, supplying countercurrently at the lower portion of the mixer ammoniacal liquor, positively feeding downwardly through the ammoniacal liquor the unpulverized quick lime containing the unburned lime stone, settling and segregating the unburned lime stone in the lower portion of the liquor removing the unburned lime stone from the liquor, washing the same with waste liquor from the process prior to reburning and reuse in the process, and subjecting the liquor containing the lime suspension to distillation to recover the ammonia therefrom.

6. The continuous process of recovering ammonia from liquor containing fixed ammonium compounds including ammonium chloride from which the free ammonia compounds have been substantially removed, comprising supplying at one end of a mixer containing a series of trays a quantity of unpulverized quick lime containing unburned lime stone in a quantity sufficient to decompose the fixed ammonium compounds, supplying countercurrently at the lower portion of the mixer ammoniacal liquor, allowing the unpulverized quick lime containing unburned lime stone to the first of the series of trays, positively feeding said material to others of said series of trays whereby the quick lime gradually works downwardly in the mixer and enters into suspension in the ammoniacal liquor, and the unburned lime stone segregates in the lower portion of the liquor, removing the unburned lime stone from the liquor, washing the same with liquor from the process prior to reburning and reuse in the process, and subjecting the liquor containing the lime in suspension to distillation to recover the ammonia therefrom.

7. The continuous process of treating liquors containing fixed ammonium compounds from which free ammonia has been substantially removed comprising positively feeding downwardly through the ammoniacal liquor quick lime containing a quantity of unburned lime stone, the quick lime being suspended in the liquor, settling and segregating the unburned lime stone, and subjecting the liquor containing the lime in suspension to distillation to recover the ammonia therefrom, and washing the separated unburned lime stone with liquor from the process prior to reburning said lime stone for reuse in the process.

In testimony whereof, I have hereunto subscribed my name this 9th day of Sept., 1926.

DWIGHT R. MEANS.